United States Patent [19]

Barringer

[11] Patent Number: 5,668,767
[45] Date of Patent: Sep. 16, 1997

[54] POLLED FIFO FLAGS

[75] Inventor: David Barringer, Milpitas, Calif.

[73] Assignee: Cypress Semiconductor Corp., San Jose, Calif.

[21] Appl. No.: 580,832

[22] Filed: Dec. 29, 1995

[51] Int. Cl.$^6$ .................................................. G11C 7/00
[52] U.S. Cl. ............... 365/221; 365/189.05; 365/189.07; 365/239; 365/189.02
[58] Field of Search ...................... 365/221, 189.01, 365/189.02, 189.05, 189.07, 239, 240

[56] References Cited

U.S. PATENT DOCUMENTS

| | | | |
|---|---|---|---|
| 4,833,651 | 5/1989 | Seltzer et al. | 365/189.07 |
| 4,839,866 | 6/1989 | Ward et al. | 365/221 |
| 4,864,543 | 9/1989 | Ward et al. | 365/221 |
| 4,888,739 | 12/1989 | Frederick et al. | 365/221 |
| 4,891,788 | 1/1990 | Kreifels | 365/49 |
| 5,027,326 | 6/1991 | Jones | 365/221 |
| 5,027,330 | 6/1991 | Miller | 365/239 |
| 5,155,810 | 10/1992 | McNamara, Jr. et al. | 395/250 |
| 5,220,586 | 6/1993 | Tai | 377/39 |
| 5,365,485 | 11/1994 | Ward et al. | 365/221 |
| 5,388,074 | 2/1995 | Buckenmaier | 365/189.05 |

*Primary Examiner*—Viet Q. Nguyen
*Attorney, Agent, or Firm*—Blakely, Sokoloff, Taylor & Zafman, LLP

[57] ABSTRACT

A First-In-First-Out (FIFO) memory device having polled status flags to provide the status of the FIFO memory device when requested by an external source. The write pointer and the read pointer in the memory device specifies the memory location which is to be accessed during the next write operation or during the next read operation, respectively. The write pointer generates a value indicating the number of write operations that have been performed and the read pointer generates a value indicating the number of read operations that have been performed. In response to a polling signal from the external source, the FIFO memory device outputs the value indicating the number of locations that are currently written (i.e. used) or the value indicating the number of locations currently unwritten (i.e. available for use).

14 Claims, 9 Drawing Sheets

POLLED FIFO FLAGS

BACKGROUND OF THE INVENTION

1. Field of the Invention

The present invention relates to the field of Semiconductor Integrated Circuits. More specifically, this invention relates to First-In-First-Out (FIFO) memory buffers.

2. Prior Art

A FIFO is often used as a memory buffer between two asynchronous systems with simultaneous read and write access. A first system writes data into the FIFO at one rate and a second system reads data out of the FIFO at a second independent rate. A typical FIFO memory device includes a Random Access Memory (RAM) array and an internal RAM pointer architecture such that there is no fall-through time between a write to a memory location and a read from that memory location. The data rate between the two systems can be regulated by monitoring the status flags and throttling the read and write accesses. Other FIFO memory architectures (e.g. those which do not use a RAM array) also typically include status flags.

To prevent the overflow and loss of data when writing to the memory, and alternatively the reading of false data when reading from the memory, Full and Empty Flags are commonly provided by such memories to halt the writing and reading operations, respectively, until the condition giving rise to the flag has passed by the further reading from or writing to the memory. FIFO flags signal the present condition of a FIFO. An Empty Flag is used to signal when the memory device is empty or not empty. A Full Flag is used to signal when the memory device is full of data or not full of data. The MK4501 memory device, a 512X9 FIFO manufactured by Mostek, is an example of a FIFO memory device having a Full Flag (FF) and an Empty Flag (EF).

In certain applications, the Full and Empty Flags do not provide a system designed with the full flexibility needed, as it may be inconvenient, illogical, or even impossible to immediately stop the writing or reading sequences of the systems connected to the FIFO memory buffer. Therefore, many commercially available FIFO memory devices provide additional status flags such as the Almost Full Flag (AFF) and Almost Empty Flag (AEF) to indicate that the FIFO memory buffer is almost at its full state or almost at its empty state such that writing and reading operations may be more conveniently terminated or initiated as the case may be, before data loss of false data is obtained. To provide even more advanced warning to stop reading and writing operations, many commercially available FIFO memory devices provide half-full flags (HF) to indicate when the FIFO is half full.

It is appreciated that FIFO memory devices currently available generate multiple flag signals to indicate the status of the FIFO at various times. Once a status flag is configured to indicate a particular condition (e.g. half full), that status flag can only be used in that configuration (e.g. half full), unless the status flag is programmable and can be reconfigured upon a RESET signal. In other words, the status flags described above can not be changed dynamically from one configuration to another during the operation of the FIFO memory device. Therefore, separate output flag signals are used to indicate an empty FIFO, a half-full FIFO, a full FIFO or other FIFO conditions, or more than one FIFO flag signal may be combined to indicate a new FIFO condition. With reference to Cypress Semiconductor U.S. Pat. No. 4,888,739, a high HF flag together with a high state Almost Full Empty (AFE) indicates that the memory is almost full, whereas a low HF flag with a high AFE flag will indicate that the memory is almost empty.

Status flags are a desirable feature of FIFO memory devices because they prevent the overflow or loss of data when reading or writing from a FIFO memory device. However, the status flags described above require additional flag logic circuitry and additional output flag pins which increase the die size and the number of outputs of each FIFO integrated circuit.

Therefore, it is advantageous to provide a FIFO memory device that can indicate the condition of the FIFO with reduced flag logic circuitry and flag pins. Furthermore, it is advantageous to poll the FIFO at any time and multiple times during its operation to determine its current condition without waiting for a predetermined status flag to be asserted.

SUMMARY OF THE INVENTION

It is desirable to provide a FIFO memory device which has polled status flags.

It is also desirable to poll the FIFO memory device multiple times during its operation to determine its current status.

It is further desirable to determine the status of the memory array without waiting for a status flag to be asserted.

A First-In-First-Out (FIFO) memory device having polled status flags is described. The FIFO memory device includes a memory array having a plurality of storage locations, an internal address circuit having a read pointer and a write pointer, an input for receiving a polling signal, and an output for providing the status of the memory array. The internal address circuit is coupled to the memory array and controls which one of the plurality of storage locations within the memory array should be accessed. The write pointer specifies the memory location to be accessed during the next write operation and the read pointer specifies the memory location to be accessed during the next read operation. The FIFO memory device has an input for receiving a polling signal that requests the status of the read pointer or the write pointer. The FIFO memory device has an output for providing the status of either the read pointer or the write pointer in response to the polling signal.

A method for generating polled status flags in a First-In-First-Out (FIFO) memory device is also described. The FIFO memory device receives a polling signal from an external source. The polling signal requests the status of an address pointer of a memory array. The FIFO memory device outputs the status of the address pointer to an external destination.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE INVENTION

The following detailed description sets forth an embodiment or embodiments in accordance with the present invention for a method and apparatus for a First-In-First-Out Memory Device having polled status flags. In the following description, details are set forth such as specific circuitry configurations, in order to provide a thorough understanding of the present invention. It will be evident, however, that the present invention may be practiced without these details. In other instances, the functioning of well-known circuit components, logic gates, etc., have not been described in particular detail so as not to obscure the present invention.

Figure 1:
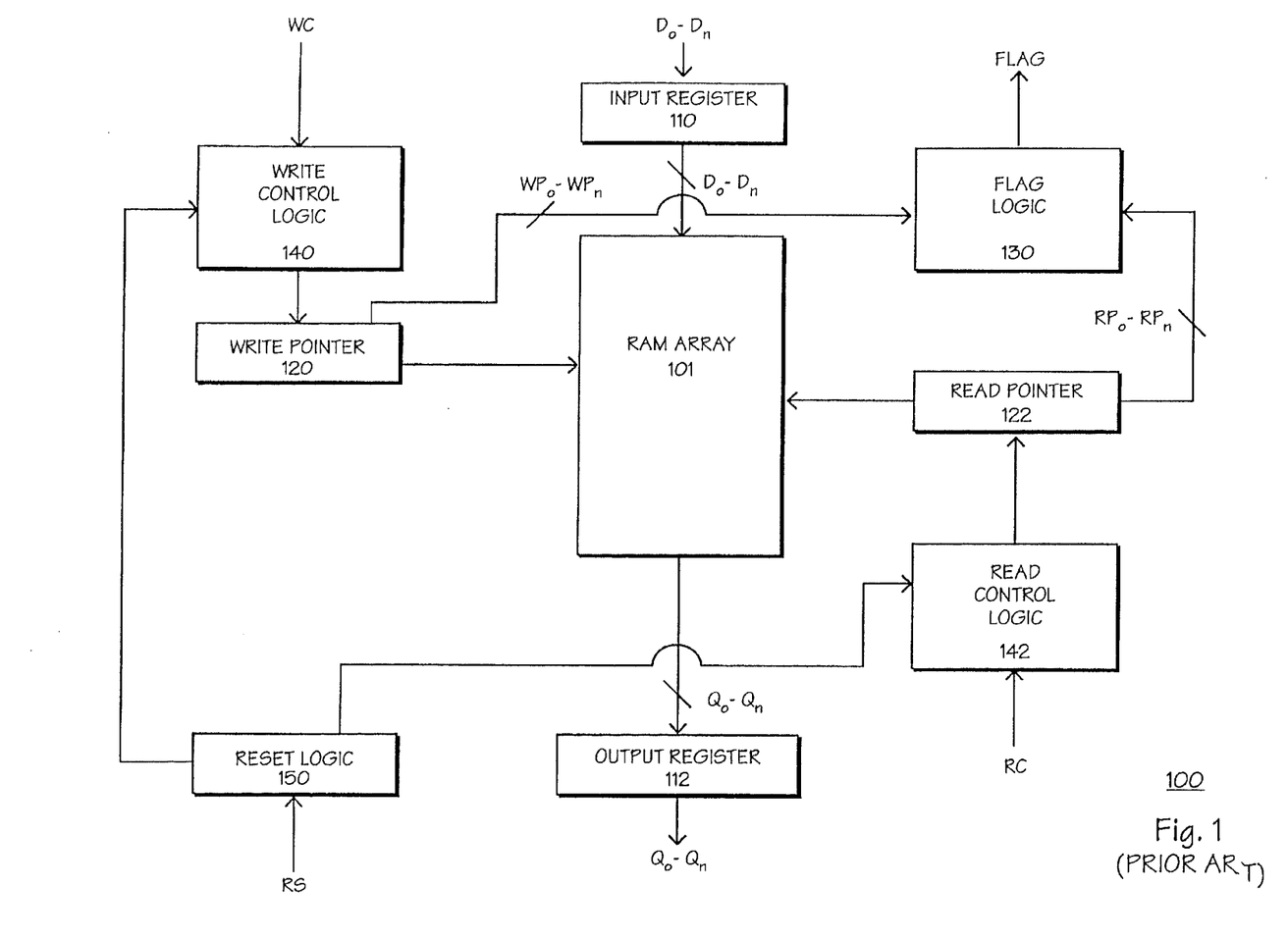
FIG. 1 illustrates a block diagram of a prior art FIFO memory device.

FIG. 1 illustrates a FIFO memory device 100 in the prior art. Random Access Memory (RAM) Array 101 includes a plurality of locations for storing data words from an external source. The FIFO 100 has an input register 110 which receives data words from an external source via inputs Do–Dn and writes data words into RAM array 101 in response to a write control signal WC. The FIFO 100 also includes an output register 112 which receives data words from the RAM array 101, in the same sequence as previously written, in response to a read control signal RC and delivers the data words to an external destination via outputs $Q_0$–$Q_n$.

The Write Control Logic 140 receives a write control signal WC that controls the write access into the RAM Array 101 by latching in a data word via data bus $D_0$–$D_n$ into Input Register 110 on a transition (e.g. high-to-low, or low-to-high) of the write control signal WC. The Write Control Logic 140 also controls the Write Pointer 120 which is coupled to the RAM array 101. The Write Pointer 120 maintains a write pointer value WP which is indicative of the number of data words which have been written into the RAM Array (e.g. number of write operations) and specifies the address location in the RAM Array 101 where the data word stored in input register 110 is to be written into. The value WP of write pointer 120, which is initially at zero in one implementation, is incremented at the completion of a write operation.

The Read Control Logic 142 receives the read control signal RC and controls the read access from RAM Array 101. The Read Control Logic 142 also controls the Read Pointer 122 which is coupled to the RAM array 101. The Read Pointer 122 maintains a read pointer value RP which is indicative of the number of data words which have been read into the RAM Array 101 (e.g. number of read operations) and specifies the address location in the RAM Array 101 where the data word is read from. A data word addressed by the Read Pointer 122 is presented on the data output bus $Q_0$–$Q_n$. Thus, the first word written into the RAM Array 101 appears on the $Q_0$–$Q_n$ output as it is being read because the write pointer value WP and the read pointer value RP are initially the same at zero. At the completion of a read operation, the value RP of the read pointer 122 is incremented, allowing the Read Pointer 122 to access the next data word from the RAM Array 101 during the next read operation. Generally, the Read Pointer 122 and the Write Pointer 120 are counters.

Figure 1A:
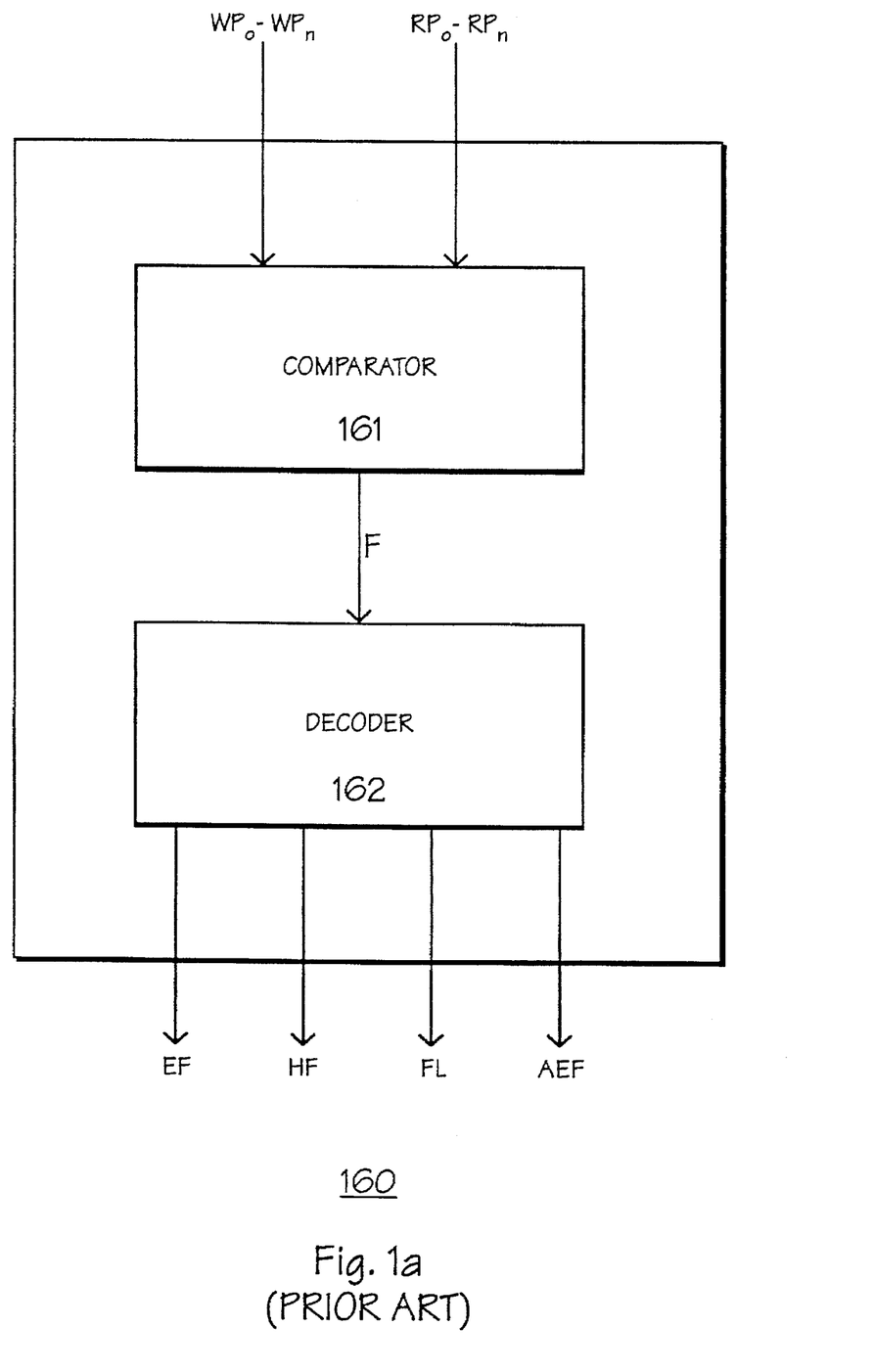
FIG. 1a illustrates the flag logic in the prior art FIFO memory devices.

To generate flags, the Write Pointer 120 and the Read Pointer 122 continuously count the number of write and read operations. These write pointer values WP and the read pointer values RP are received by the Flag Logic 130 which generates the output flag signals. Both the Write Address Pointer 120 and the Read Address Pointer 122 wrap around from m to 0, where m is the number of memory locations in RAM Array 101. Flag Logic 160 in FIG. 1a includes a comparator 161 that monitors the value WP from the Write Pointer 120 and the value RP from the Read Pointer 122 and generates an output which represents the difference between the write pointer value and the read pointer value. The Comparator 161 continuously generates an arithmetic difference D between the value WP of the Write Pointer 120 and the value RP of the Read Pointer 122, where D=WP−RP+1. This value D is then decoded by Decoder 162 to generate an output flag signal that may represent various conditions of the FIFO as it occurs such as empty status, full status, half-full status, etc.

The following example is used to illustrate how status flags are generated with a RAM Memory Array 101 having 64 memory locations. When the value WP of the Write Pointer 120 equals the value RP of the Read Pointer 122, then the FIFO 100 is empty and any data words which have been written into the FIFO 100 have also been read out. When this condition occurs the Flag Logic 130 generates an Empty Flag Signal. When the value WP of the Write Pointer 120 exceeds the value RP of the read pointer 122 by 64, then the FIFO 100 is full and the next storage location of RAM 100 into which data should be written contains the oldest word that has not yet been read. When this condition occurs the Flag Logic 130 generates a Full Flag Signal. Other Flag Signals such as half-full flag or an almost empty/full flag may also be generated.

In addition to the flags described above, the FIFO memory device 100 may include programmable flags such as the programmable almost empty/full flag disclosed in the Cypress CY7C470 FIFO with programmable flags. It is well known to those skilled in the art that the programmable status flags in a FIFO memory device are programmed during a programming mode. During the programming mode, programming data is input into an offset register such that the value stored in the offset register defines the condition in which the status flag will be asserted. Therefore, the programming of the status flags will not be described in further detail.

FIFO 100 also includes Reset Logic 150 which receives an input signal RS. Upon command, reset signal RS resets various parts of the FIFO 100 circuit. According to FIG. 1, the Reset Logic 150 is coupled to the Write Control Logic 140 and the Read Control Logic 142 such that the reset signal RS resets the write counter in the Write Pointer 120 and the read counter in the Read Pointer 122 to the first location. Once the FIFO memory device is initialized and is operating under normal conditions by performing read and write operations, the programmable status flags can not be reprogrammed until the FIFO memory device is reset and loaded with new programming data during the programming mode. In other words, the FIFO memory device can not be programmed dynamically once the device is in normal operation.

Figure 2:
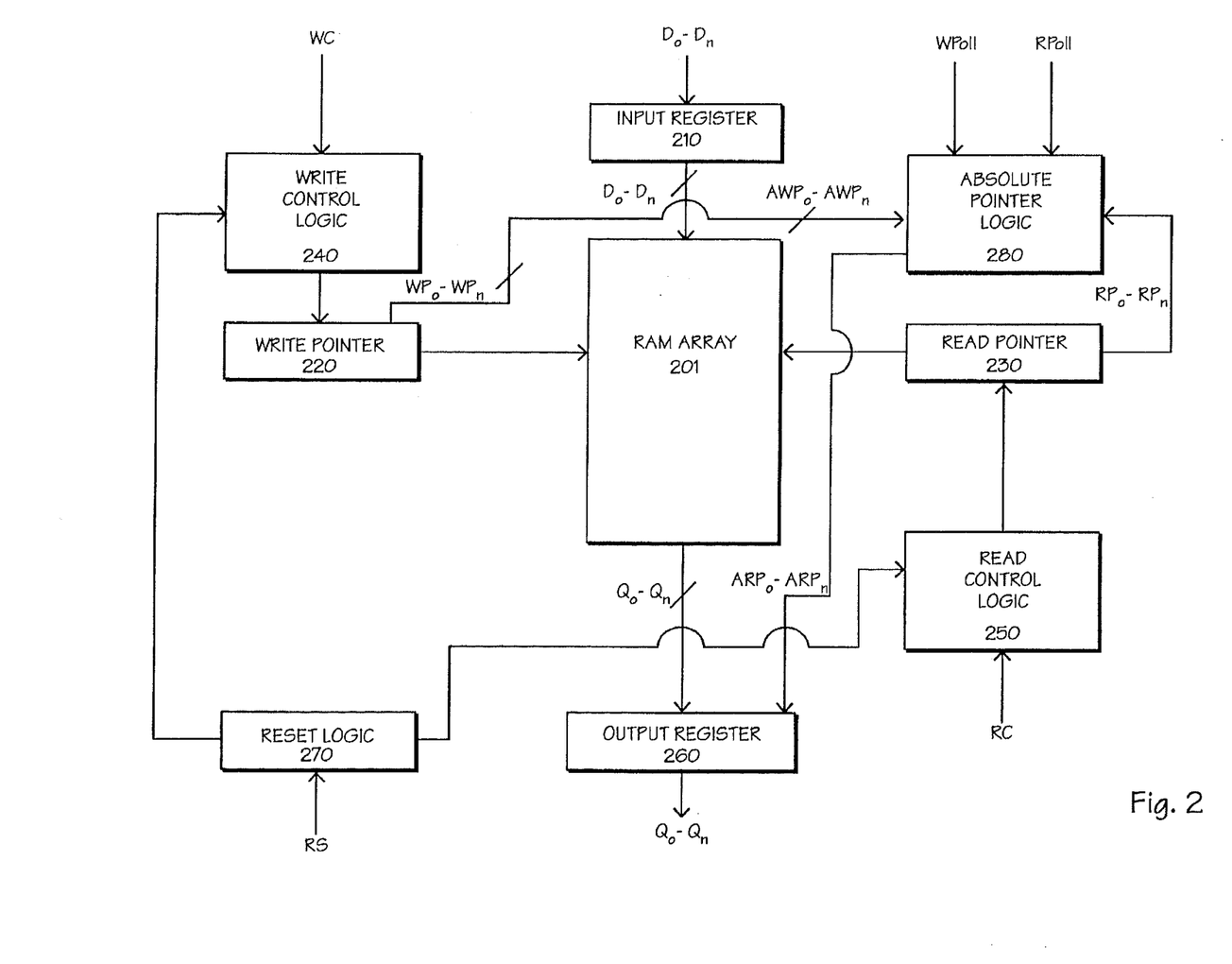
FIG. 2 illustrates an embodiment of the FIFO memory device of the present invention.

FIG. 2 illustrates a block diagram of a FIFO memory device 200 in the present invention. The RAM Array 201 includes a plurality of memory locations for storing a data word in each location. The data input Do–Dn is received by the Input/Output Register 210 and is inputted into the RAM Array 201 in response to the write control signal WC received by the Write Control Logic 240. The Write Control Logic 240 controls the Write Pointer 220 which is coupled to the RAM Array 201 such that when the write control signal WC is asserted (e.g. transistioned from a low-to-high state or a high-to-low state) the Write Pointer 220 specifies the address location in RAM Array 201 in which input data Do–Dn is to be written into. The Write Pointer 220 maintains a write pointer value WP which is indicative of the number of data words which have been written in RAM Array 201 (e.g. the number of write operations).

The data stored in RAM Array 201 is outputted from the FIFO memory device 200 via Output Register 260 in response to the read control signal RC received by the Read Control Logic 250. The first data written into RAM Array 201 is the first data that is read from RAM Array 201. The Read Control Logic 250 controls the Read Pointer 230 which is coupled to the RAM Array 201 such that when the read control signal RC is asserted (e.g. transistioned from a low-to-high state or a high-to-low state) the Read Pointer 230 specifies the address location in RAM Array 201 in which output data $Q_0$–$Q_n$ is to read from. The Read Pointer 230 maintains a read pointer value RP which is indicative of the number of data words which have been read from RAM Array 201 (e.g. the number of read operations).

Figure 3:
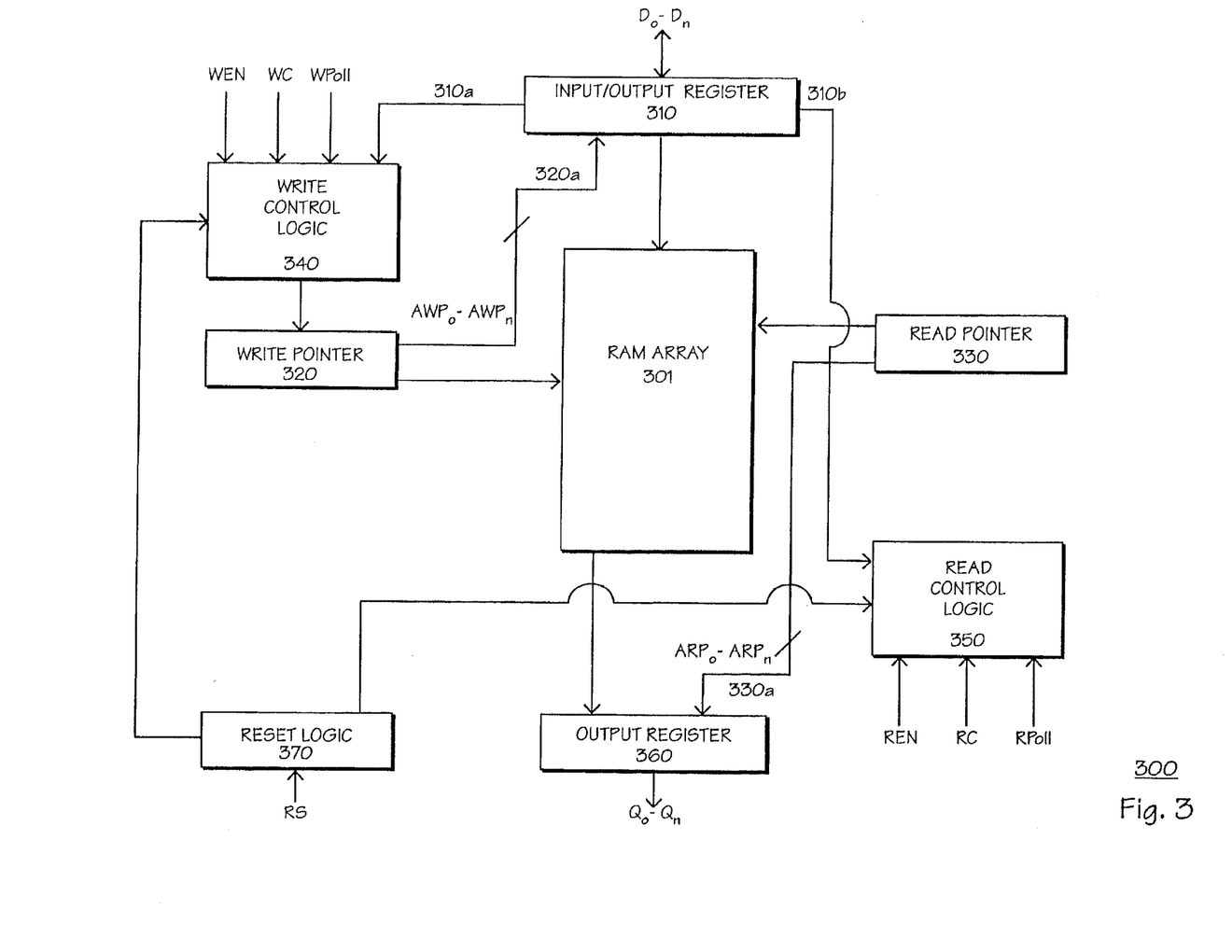
FIG. 3 illustrates an embodiment of the FIFO memory device of the present invention in which the format of the output can be programmed.
Figure 4:
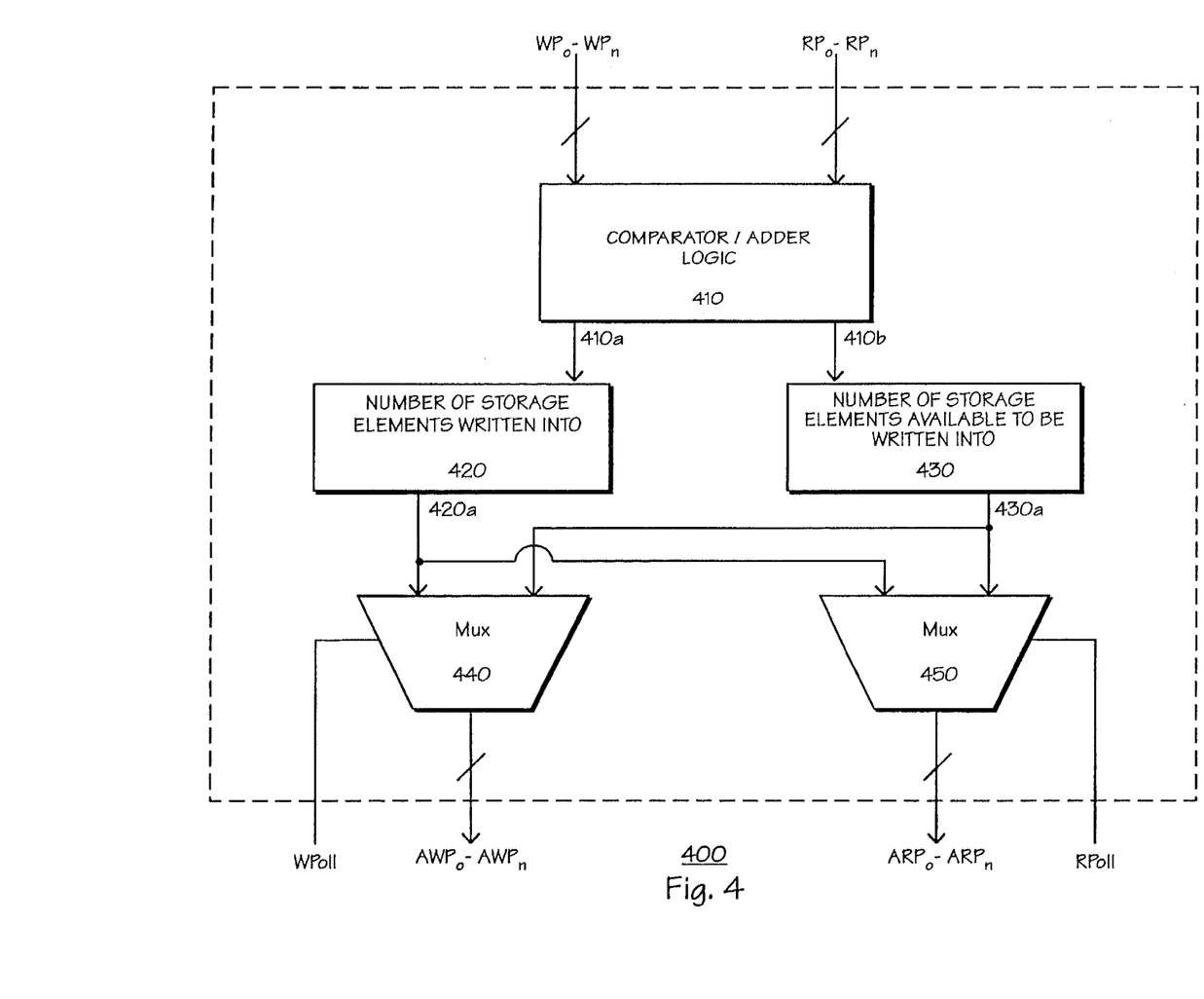
FIG. 4 illustrates one embodiment of the Absolute Pointer Logic in the present invention.
Figure 5:
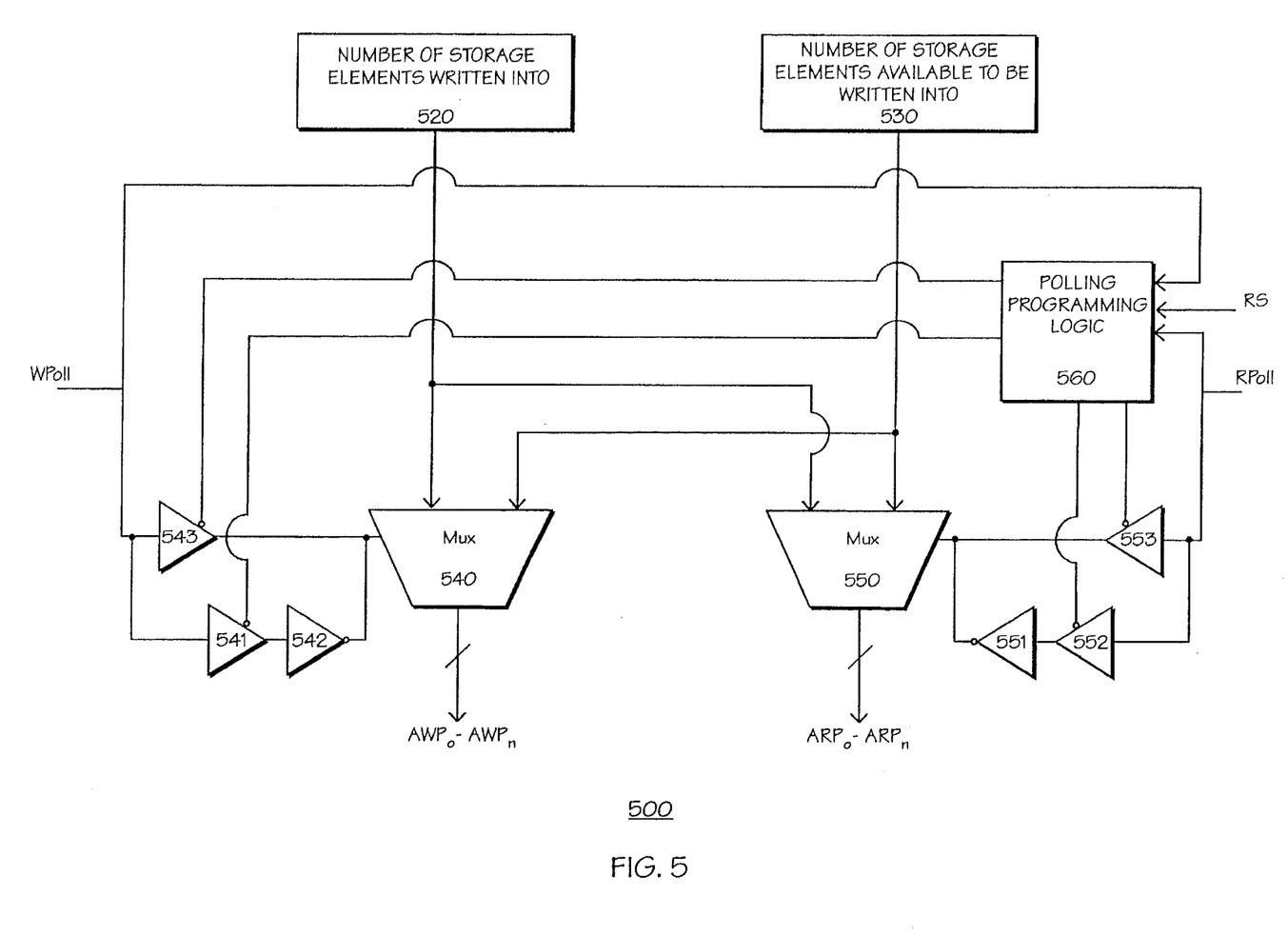
FIG. 5 illustrates a block diagram of an embodiment of the programming circuit used to program the outputs.

The FIFO Memory Device 200 includes the Reset Logic 270 which receives an input signal RS. Upon command, the reset signal RS resets various parts of the FIFO Memory Device 200. The reset signal RS in combination with RPoll and WPoll can be used to program the specific meanings or the format of the outputs $AWP_{0-n}$ and $ARP_{0-n}$ used during polling. For example, the default conditions illustrated in FIG. 2 shows that $AWP_{0-n}$ values are generated and outputted in response to the WPoll signal and the $ARP_{0-n}$ values are generated and outputted in response to the RPoll signal. In one embodiment, the Memory Device 200 is programmed to generate the $AWP_{0-n}$ and the $ARP_{0-n}$ values in response to the reset signal RS and the WPoll and RPoll signals received by the Absolute Pointer Logic as shown in FIG. 4. Furthermore, FIG. 5 demonstrates one embodiment of a programming circuit that uses the reset signal to program the meaning of either the absolute read pointer value $ARP_{0-n}$ or the absolute write pointer value $AWP_{0-n}$ as desired by the user. In an alternative embodiment, the Memory Device 300 is programmed to generate the output values $AWP_{0-n}$ and $ARP_{0-n}$ in response to the combination of the reset signal RS and the WPoll signal received by the Write Control Logic and the RPoll received by the Read Control Logic, as shown in FIG. 3. The use of the reset signal RS to program the meaning of the WPoll and the RPoll to generate either the $AWP_{0-n}$ and the $ARP_{0-n}$ values, as shown in FIGS. 3, 4 and 5 will be described in further detail in the following discussion.

Although FIG. 2 does not illustrate any conventional flag logic circuitry, the FIFO memory device 200 in the present invention may include a conventional flag logic circuit to generate status flags which are asserted when a specified condition is satisfied. For example, when the FIFO memory device 200 is empty or is full.

The FIFO memory device 200 described so far operates in a similar manner as the FIFO memory device 100 under normal operating conditions such as during a read operation or a write operation. However, the FIFO memory device 200 provides the added functionality of determining the status of the RAM Array 201 while the FIFO memory device is operating under normal conditions. The status of the RAM Array 201 is determined by polling or requesting the status of the Write Pointer 220 or the Read Pointer 230 during the normal operation of the device. In response to a write polling signal WPoll received by the Absolute Pointer Logic 280, the Absolute Write Pointer 280 outputs a write pointer value $AWP_{0-n}$, which indicates the number of data words which have been written into RAM Array 201, over line 220a to the Input/Output Register 210. In an alternative embodiment, the write pointer value $AWP_{0-n}$ indicates the number of memory locations in RAM Array 201 available to be written into or may provide some other meaning to the write pointer value $AWP_{0-n}$. The Input/Output Register 210 outputs the absolute write pointer value $AWP_{0-n}$ to an external source. The external source may be a peripheral device or a microprocessor. Unlike the FIFO memory device shown in FIG. 1, the register 210 not only receives the input data Do–Dn but also operates as an output register to output the write pointer value $AWP_{0-n}$.

In response to a read polling signal RPoll received by the Absolute Pointer Logic 280, the Absolute Pointer Logic 280 outputs the absolute remaining space also referred to as the absolute read pointer value $ARP_{0-n}$, which indicates the number of data words that are available in the RAM Array 201, over lines 230a to the Output Register 260. The Output Register 260 outputs the absolute read pointer value $ARP_{0-n}$ to an external source. The external source may or may not be the same external source that received the absolute write pointer value $AWP_{0-n}$. Furthermore, it is not required that both the status of the Write Pointer 220 and the Read Pointer 230 be polled.

As discussed above, the write pointer value $AWP_{0-n}$ and the read pointer value $ARP_{0-n}$ can be programmed to a specific meaning or format to output the absolute write pointer value $AWP_{0-n}$ and the absolute read pointer value $ARP_{0-n}$. For example, in response to the WPoll signal, the output may be the number of memory locations in the RAM Array 301 in which data has been written into (e.g. $AWP_{0-n}$) or the number of memory locations in the RAM array 301 in which data has not been written into (e.g. $ARP_{0-n}$). Similarly, in response to the RPoll signal, the output $AWP_{0-n}$ may be the number of memory locations in the RAM Array 301 in which data has been written into ($AWP_{0-n}$) or the number of memory locations in the RAM Array 301 in which data has not been written into ($ARP_{0-n}$). Assuming that the RAM Array 301 has written 512 memory locations and the Read Pointer 330 is pointing to memory location 40. One possible output value from an Rpoll signal is the $ARP_{0-n}$ value 40, which represents the number of memory locations which are available to be written into and a second possible output value from an Rpoll signal is the value $AWP_{0-n}$ 472 (e.g. 472=512–40), which represents the number of memory locations which have been written or are yet to be read.

According to FIG. 4, the circuitry to program the meaning of the outputs $AWP_{0-n}$ and $ARP_{0-n}$ is located within the Absolute Pointer Logic 400. The Comparator/Adder Logic 410 receives the write pointer values $WP_{0-n}$ in response to the WPoll signal and receives the read pointer value $RP_{0-n}$ in response to the RPoll signal. Generally, the Comparator/Adder Logic 410 operates in a similar manner to prior art Flag Logic shown in FIG. 1a. However, the Comparator/Adder Logic 410 has an output 410a that is coupled to a register 420 which represents the number of storage elements written into the Memory Array 201, and an output 410b that is coupled to a register 430 which represents the number of storage elements available to be written into the Memory Array 201. Muxes 440 and 450 are both coupled to the output 420a of the Register 420 and the output 430a of the Register 430 such that Mux 440 selects one of the outputs 420a and 430a in response to the WPoll signal and Mux 450 selects one of the outputs 420a and 430a in response to the RPoll signal. Mux 440 and 450 are coupled to the output of the Absolute Pointer Logic 400 such that the Mux 440 outputs the absolute read pointer value $ARP_{0-n}$ and the Mux 450 outputs the absolute write pointer value $AWP_{0-n}$.

FIG. 5 demonstrates an embodiment of a programming circuit that uses the reset signal to program the meaning of the WPoll and the WPoll signals to generate the $ARP_{0-n}$ and $AWP_{0-n}$ values as desired by a user. The Polling Programming Logic 560 receives the reset signal RS, the write polling signal WPoll and the read polling signal RPoll. The Polling Programming Logic 560 is coupled to the buffers 543, 541, 553 and 552 to enable the buffers 543, 541, 553 and 552 in response to the reset signal RS, the write polling signal WPoll and the read polling signal RPoll. Muxes 540 and 550 are each coupled to the Registers 520 and 530 such that one of the outputs from Register 520 and Register 530 is selected. The Mux 540 provides the absolute write pointer value $AWP_{0-n}$ in response to the select circuit comprising the buffers 543 and 541 and the inverter 542. Furthermore, the Mux 550 provides the absolute read pointer value $ARP_{0-n}$ in response to the select circuit comprising the buffers 552 and 553 and the inverter 551.

Figure 2A:
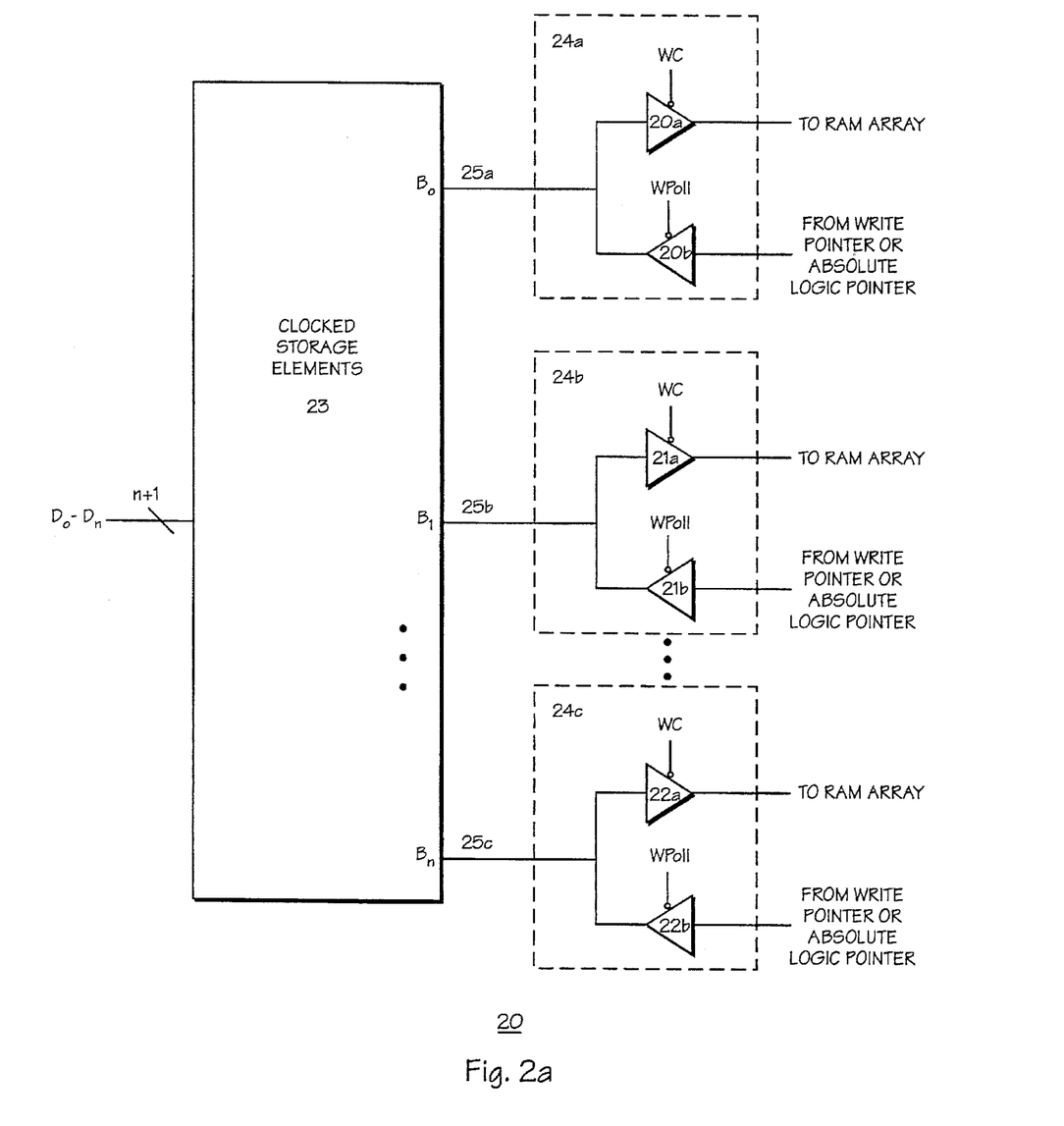
FIG. 2a illustrates one embodiment of an Input/Output Register of the present invention in more detail.

FIG. 2a illustrates one embodiment of the Input/Output Register 210. The Input/Output Register 20 includes n+1 Clocked Storage Elements 23 coupled to n+1 Input/Output Buffers 24a–24c. The Input/Output Register 20 operates as an input register when the write control signal WC is asserted (e.g. high state) such that buffers 20a, 21a and 22a are enabled and the write polling signal is deasserted (e.g. low state) such that buffers 20b, 21b and 22b are disabled. When the Input/Output Register 20 is operating as an input register, the n+1 Clocked Storage Elements 23 receives n+1 data inputs $D_0$–$D_n$ from an external source and outputs the n+1 data outputs $B_0$–$B_n$ over lines 25a–25c. The data $B_0$–$B_n$ passes through the enabled buffers 20a–22a to the RAM Array.

On the other hand, the Input/Output Register 20 operates as an output register when the write polling signal WPoll is asserted (e.g. high state) such that buffers 20b, 21b and 22b are enabled and the write control signal WC is disabled (e.g. asserted low). When the Input/Output Register 20 is operating as an output register, the absolute write pointer value $AWP_{0-n}$ from the Absolute Pointer Logic 280 or from the Write Pointer 320 passes through the enabled buffers 20b–22b over lines 25a–25c to the n+1 Clocked Storage Elements 23. The data stored in the n+1 Clocked Storage Elements 23 is outputted from the FIFO to an external source.

Figure 2B:
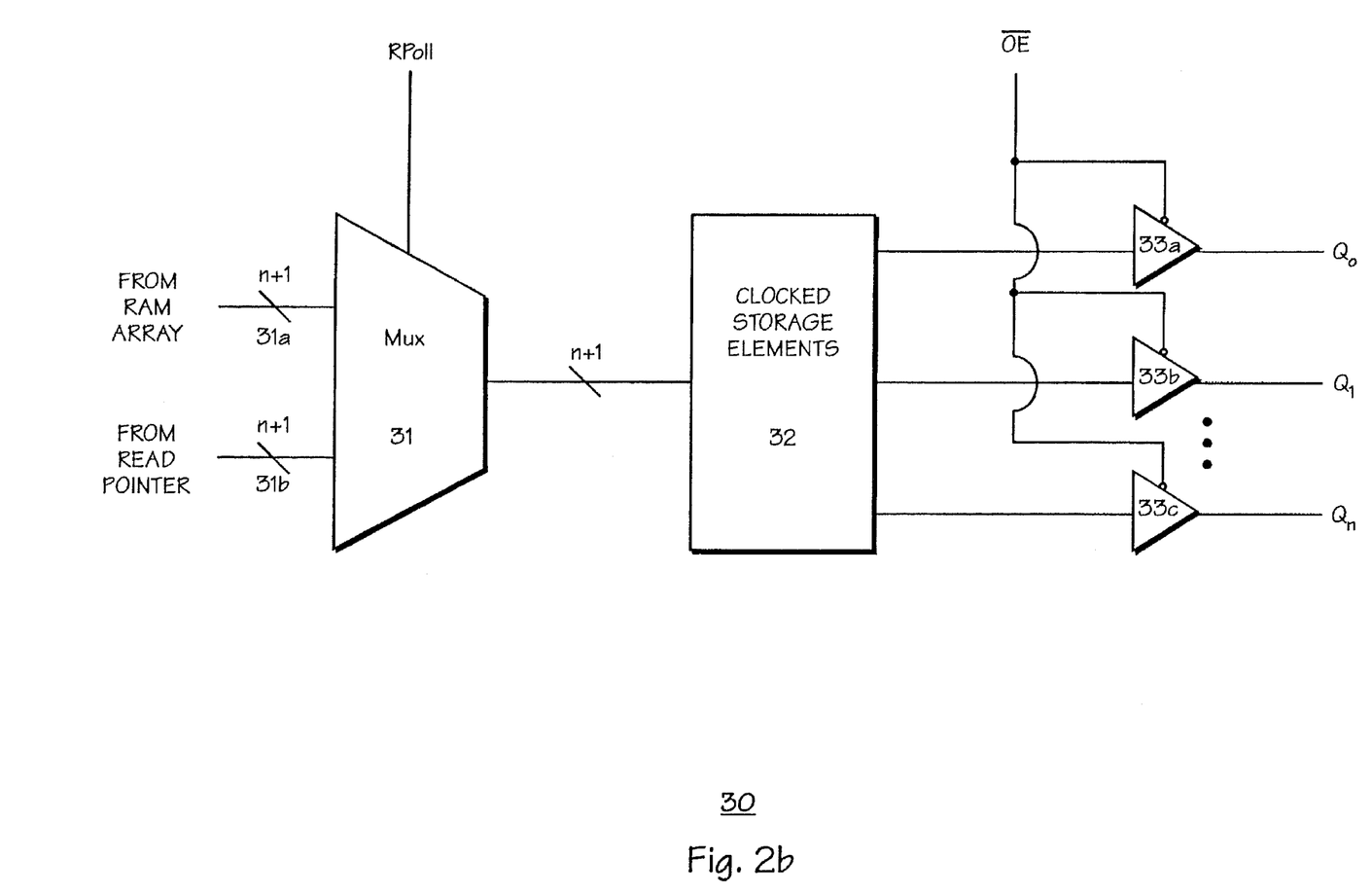
FIG. 2b illustrates one embodiment of an Output Register of the present invention in more detail.

FIG. 2b illustrates one embodiment of the Output Register 260. The Output Register 260 receives data from either the RAM Array over n+1 lines 31a or from the Read Pointer over n+1 lines 31b. The Mux 31 selects the lines 31a or lines 31b depending on the read polling signal RPoll. For example, if the read polling signal RPoll is asserted (e.g. high state) the Mux 31 selects lines 31b such that the absolute read pointer value $AWP_{0-n}$ from the Absolute Pointer Logic 280 or from the Read Pointer 330 is inputted into the n+1 Clocked Storage Elements 32 and outputted from the FIFO through buffers 33a, 33b and 33c when enabled by the output enable signal OE. However, if the read polling signal RPoll is not asserted (e.g. low state) then the Mux 31 selects lines 31a such that data from the RAM Array is inputted into the n+1 Clocked Storage Elements 32 and outputted from the FIFO through buffers 33a, 33b and 33c when enabled by the output enable signal OE. The output data $Q_o$–$Q_n$ is outputted to an external source.

FIG. 3 illustrates another embodiment of a FIFO memory device of the present invention. In this embodiment of the present invention, the format of the write pointer values $WP_{0-n}$ and the read pointer value $RP_{0-n}$ is programmed to output the absolute write pointer value $AWP_{0-n}$ and the absolute read pointer value $ARP_{0-n}$ via the Input/Output Register 310 or the Output Register 360, respectively. During the normal operation of the FIFO memory device 300, the status of the absolute write pointer value $WP_{0-n}$ and the status of the absolute read pointer value $ARP_{0-n}$ can be polled unless operating in the programming mode when the reset signal RS is asserted or by some other means (e.g. EPROMs).

The meaning of the WPoll and the RPoll signal are programmed during the write programming mode. In this embodiment of the present invention, the Write Control Logic 340 receives a write enable signal WEN and a reset signal RS such that during the write programming mode, the write enable signal WEN and the reset signal RS are both asserted (e.g. in a low state). When both the write enable signal WEN and the reset signal RS are asserted, the FIFO memory device 300 recognizes that the input data Do–Dn received by the Input/Output Register 310 is programming data for programming the format of the write pointer value WP. Unlike the input data Do–Dn received by the Input/Output Register 310 during a writing operation which is stored in the RAM Array 301, the input data Do–Dn received by the Input/Output Register 310 over line 310a during a write programming operation is stored in a register located within the Write Control Logic 340. In an alternative embodiment, the write programming data may be stored in a register that is located outside the Write Control Logic 340. The Write Control Logic 340 uses the programming data to select one of a plurality of write pointer settings for the WPoll signal. Therefore, when the Write Control Logic 340 receives a write polling signal Wpoll, the Write Pointer 320 outputs the write pointer value WP over line 320a to Input/Output Register 310 such that the write pointer value WP having a specified format is available at the output of FIFO memory device 300.

According to FIG. 3, the Read Control Logic 350 receives a read enable signal REN and a reset signal RS such that during the read programming mode, the read enable signal and the reset signal are both asserted (e.g. in a low state). When both the read enable signal REN and the reset signal RS are asserted, the FIFO memory device 300 recognizes that the input data Do–Dn received by the Input/Output Register 310 is programming data for programming the format of the read pointer value RP. The input data Do–Dn received by the Input/Output Register 310 during a read programming operation is received by the Read Control Logic 350 over line 310b and stored in a register located within the Read Control Logic 350. In an alternative embodiment, the read programming data is stored in a register located outside the Read Control Logic 350. The Read Control Logic 350 uses the programming data to select one of a plurality of pointer settings for the RPoll signal. Therefore, when the Read Control Logic 350 receives a read polling signal Rpoll, the Read Pointer 330 outputs the absolute read pointer value $ARP_{0-n}$ over line 330a to Output Register 360 and is available at the output of FIFO memory device 300.

Figure 3A:
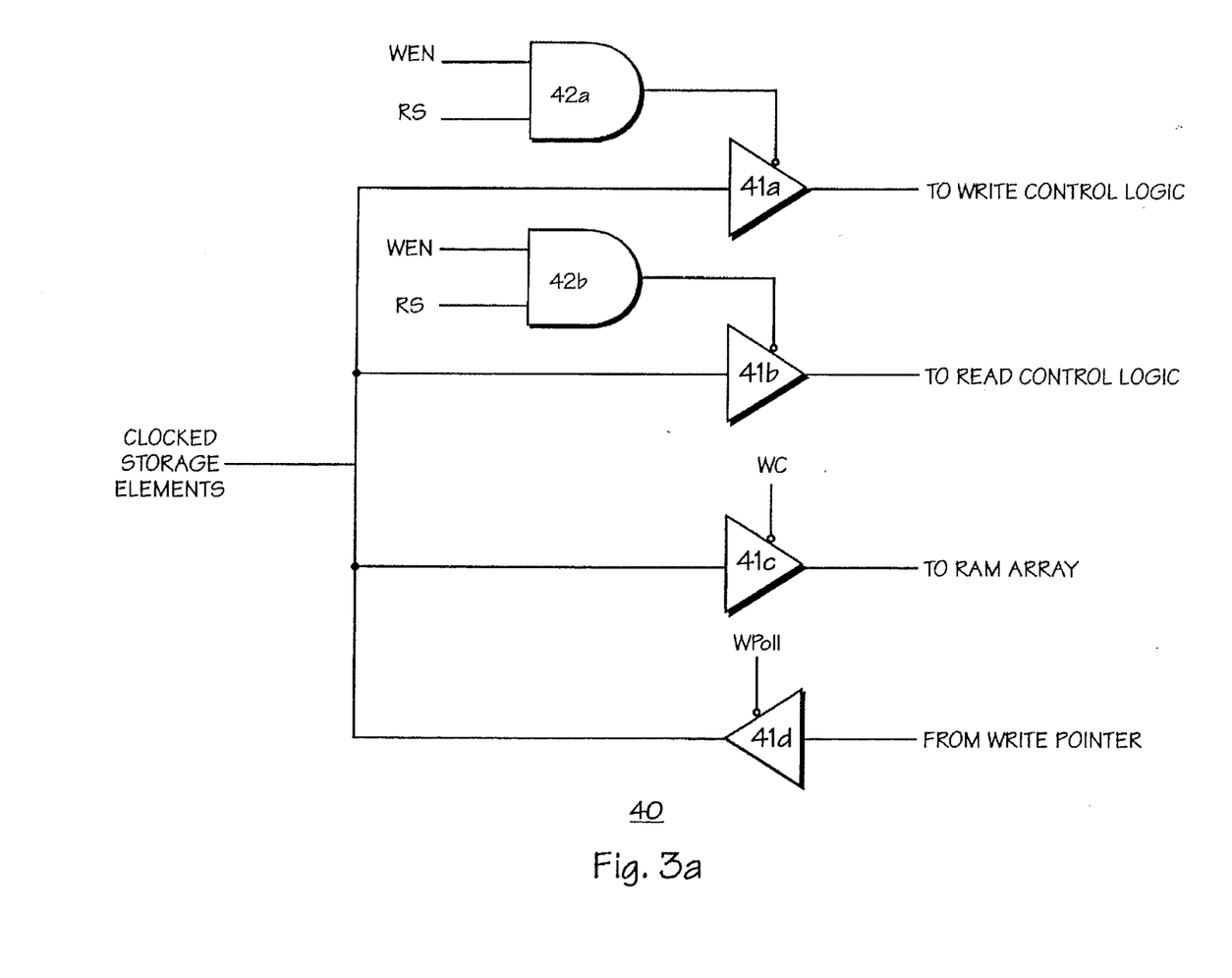
FIG. 3a illustrates one of the Input/Output buffers in the Input/Output Register of the present invention.

FIG. 3a illustrates one embodiment of one of the Input/ Output buffers in the Input/Output Register 310. The Input/ Output Buffer 40 receives data from one of the n+1 clocked storage elements. The Input/Output Buffer 40 operates as an input buffer when one of the buffers 41a, 41b or 41c is enabled and operates as an output buffer when buffer 41d is enabled. Typically, only one of the buffers 41a, 41b, 41c and 41d are enabled at a time. The buffer 41a is enabled when both the write enable signal WEN and the reset signal RS are asserted. When buffer 41a is enabled, the data received from one of the clocked storage elements passes through buffer 41a to the Write Control Logic. The buffer 41b is enabled when both the read enable signal and the reset signal are asserted. When buffer 41b is enabled, the data received from one of the clocked storage elements passes through buffer 41b to the Read Control Logic. The buffer 41c is enabled when the write control signal WC is asserted. When the buffer 41c is enabled, the data from one of the clocked storage elements passes through buffer 41c to the RAM Array. The buffer 41d is enabled when the write polling signal 41d is asserted. When buffer 41d is enabled, the absolute write pointer value $AWP_{0-n}$ from the Write Pointer passes through buffer 41d to one of the clocked storage elements.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regard in an illustrative rather than a restrictive sense.

What is claimed is:

1. A First-In-First-Out (FIFO) Integrated Circuit (IC) comprising:

a memory having a plurality of storage locations;

an internal address circuit coupled to said memory and configured to indicate one of said plurality of storage locations to be accessed during a next write operation and one of said plurality of storage locations to be accessed during a next read operation, said internal address circuit further having a read pointer and write pointer; and logic circuitry coupled to said internal address circuit and configured to receive one or more polling signals and to generate one or more absolute pointer values in response thereto, said absolute pointer values indicating one or more absolute states of said storage locations of said memory array.

2. The FIFO IC of claim 1, further comprising a flag circuitry wherein said flag circuitry provides at least one flag output indicating a condition of said FIFO IC.

3. The FIFO IC of claim 1, wherein said internal address circuit further comprises a write control logic and a read control logic.

4. The FIFO IC of claim 3, further comprising a first register coupled to said write pointer wherein said first register receives a first value from said write pointer representing a first state of said storage locations in response to a first of said polling signals and a second register coupled to said read pointer wherein said second register receives a second value from said read pointer representing a second state of said storage locations in response to a second of said polling signals.

5. The FIFO IC of claim 4, wherein said first value can be programmed to one of a plurality of output formats during a write programming mode and said second value can be programmed to one of said plurality of output formats during a read programming mode.

6. The FIFO IC of claim 5, wherein during said write programming mode said write control logic receives first programming data from said first register and wherein during said read programming mode said read control logic receives second programming data from said first register.

7. The FIFO IC of claim 5, further comprising reset logic wherein said write programming mode and said read programming mode may be activated by a signal generated by said reset logic.

8. An apparatus for generating polled status flags, comprising:

a memory having a plurality of storage locations;

a first pointer and a second pointer coupled to said memory, said first pointer indicates a storage location of said memory that will be accessed during a next write operation, said second pointer indicates said storage location of said memory that will be accessed during a next read operation;

a control logic coupled to said first pointer and said second pointer wherein said control logic receives a first polling signal and a second polling signal;

a first register coupled to said first pointer wherein said first register having an output for providing a first value indicating a first state of said memory in response to said first polling signal; and a second register coupled to said second pointer wherein said second register having an output for providing a second value indicating a second state of said memory in response to said second polling signal.

9. The apparatus as in claim 8, wherein said first register further having an input for receiving input data to be stored in said memory, said output of said second register outputting output data from said memory.

10. The apparatus as in claim 9, further having flag logic coupled to said first pointer and said second pointer wherein said flag logic outputs at least one flag signal indicating a condition of said apparatus.

11. The apparatus of claim 8, wherein said first value can be programmed to one of a plurality of output formats during a write programming mode and said second value can be programmed to one of a plurality of output formats during a read programming mode.

12. The apparatus of claim 11, wherein during said write programming mode said write control logic receives a first signal and a second signal such that said write control logic receives and stores programming data from said first register in response to said first signal and said second signal, wherein during said read programming mode said read control logic receives said second signal and a third signal such that said read control logic receives and stores said programming data from said first register in response to said second and said third signal.

13. The apparatus of claim 12, further comprising reset logic wherein said second signal is generated by said reset logic.

14. A method for generating polled status flags, comprising the steps of:

(a) receiving a polling signal from an external source;

(b) determining a state of a Memory Array; and (c) outputting a value indicating an absolute state of said memory array to said external source.

* * * * *